US011301214B2

(12) United States Patent
Lo et al.

(10) Patent No.: US 11,301,214 B2
(45) Date of Patent: Apr. 12, 2022

(54) DEVICE FOR PERFORMING MULTIPLY/ACCUMULATE OPERATIONS

(71) Applicants: VeriSilicon Microelectronics (Shanghai) Co., Ltd., Shanghai (CN); VeriSilicon Holdings Co., Ltd., George Town (KY)

(72) Inventors: Mankit Lo, San Jose, CA (US); Meng Yue, Shanghai (CN); Jin Zhang, Shanghai (CN)

(73) Assignees: VeriSilicon Microelectronics (Shanghai) Co., Ltd., Shanghai (CN); VeriSilicon Holdings Co., Ltd., George Town (KY)

( * ) Notice: Subject to any disclaimer, the term of this patent is extended or adjusted under 35 U.S.C. 154(b) by 0 days.

(21) Appl. No.: 16/897,190

(22) Filed: Jun. 9, 2020

(65) Prior Publication Data

US 2021/0382689 A1 Dec. 9, 2021

(51) Int. Cl.
 *G06F 7/523* (2006.01)
 *G06F 7/544* (2006.01)
 *G06F 7/50* (2006.01)

(52) U.S. Cl.
 CPC .............. *G06F 7/5443* (2013.01); *G06F 7/50* (2013.01); *G06F 7/523* (2013.01)

(58) Field of Classification Search
 CPC ....... G06F 7/523; G06F 7/5324; G06F 7/5443
 See application file for complete search history.

(56) References Cited

U.S. PATENT DOCUMENTS

| | | | | |
|---|---|---|---|---|
| 5,138,570 | A * | 8/1992 | Argade | G06F 7/523 |
| | | | | 708/552 |
| 6,347,326 | B1 * | 2/2002 | Jensen | G06F 7/525 |
| | | | | 708/625 |
| 2019/0392287 | A1 * | 12/2019 | Ovsiannikov | G06N 3/04 |
| 2020/0364287 | A1 * | 11/2020 | Bekooij | G06F 7/523 |
| 2021/0073171 | A1 * | 3/2021 | Master | G06F 9/4881 |

FOREIGN PATENT DOCUMENTS

EP 3374853 9/2018

* cited by examiner

*Primary Examiner* — Chuong D Ngo
(74) *Attorney, Agent, or Firm* — David R. Stevens; Stevens Law Group

(57) ABSTRACT

A circuit for performing multiply/accumulate operations evaluates a type of each value of a pair of input values. Signed values are split into sign and magnitude. One or more pairs of arguments are input to a multiplier such that the arguments have fewer bits than the magnitude of signed values or unsigned values. This may include splitting input values into multiple arguments and inputting multiple pairs of arguments to the multiplier for a single pair of input values.

18 Claims, 4 Drawing Sheets

DEVICE FOR PERFORMING MULTIPLY/ACCUMULATE OPERATIONS

BACKGROUND

Field of the Invention

This invention relates to systems and methods for performing high volumes of mathematical operations.

Background of the Invention

One of the most common ways to boost speed of execution is to perform operations in parallel, such as in multiple processor cores. This principle is exploited on a much larger scale by configuring graphics processing units (GPUs) with many (e.g., many thousands) of processing pipelines that may each be configured to perform a mathematical function. In this manner, large amounts of data may be processed in parallel. Although originally used for graphics processing applications, GPUs are also often used for other applications, particularly artificial intelligence.

It would be an improvement in the art to improve the function of a GPU pipeline or of any processing device including many processing units.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
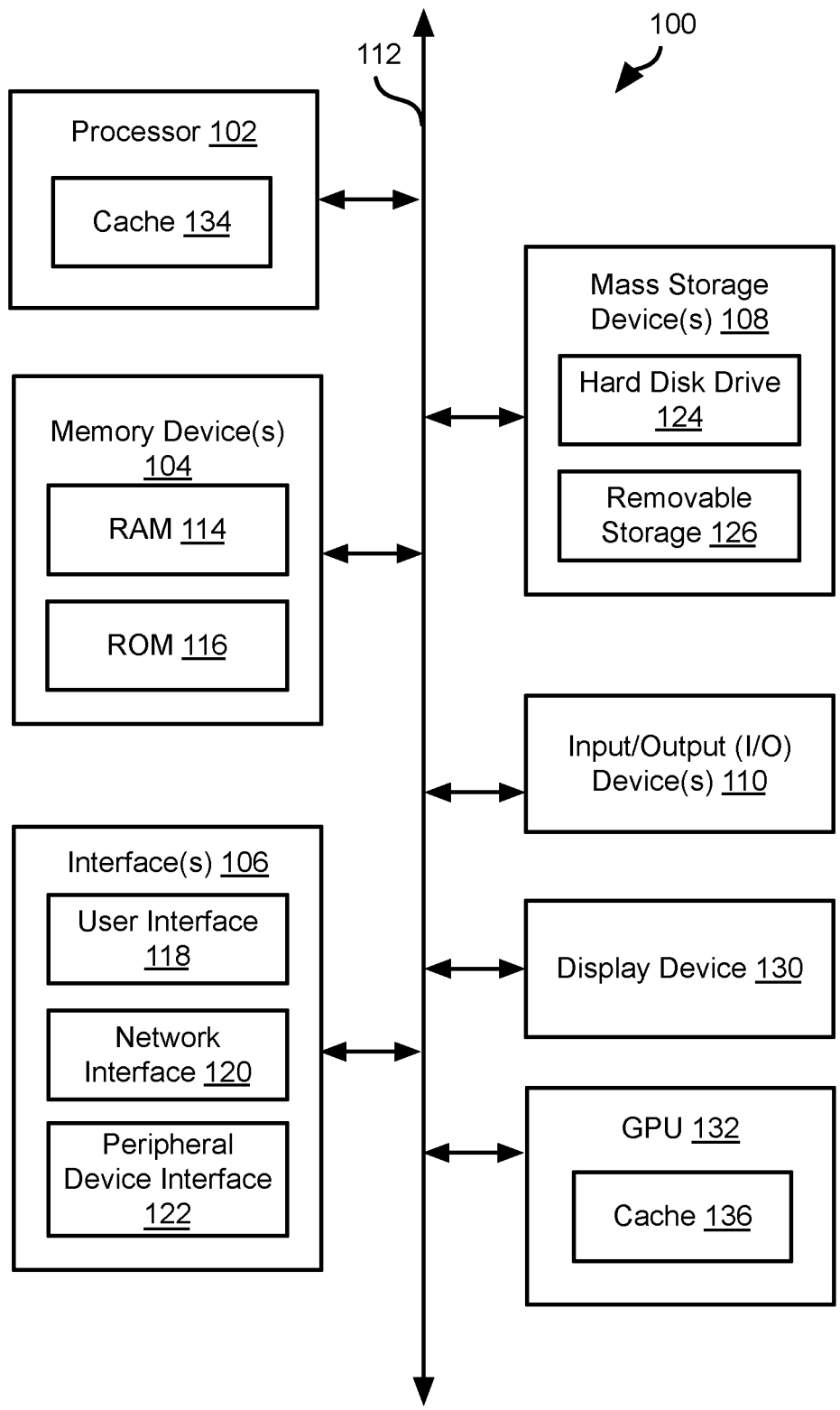
FIG. 1 is a schematic block diagram of a computer system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

A graphics-processing unit (GPU) 132 may be coupled to the processor(s) 102 and/or to the display device 130. The GPU may be operable to render computer generated images and perform other graphical processing. The GPU may include some or all of the functionality of a general-purpose processor, such as the processor(s) 102. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In some embodiments, a processor 102 may include a cache 134, such as one or both of a L1 cache and an L2 cache. A GPU 132 may likewise include a cache 136 that may likewise include one or both of a L1 cache and an L2 cache.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
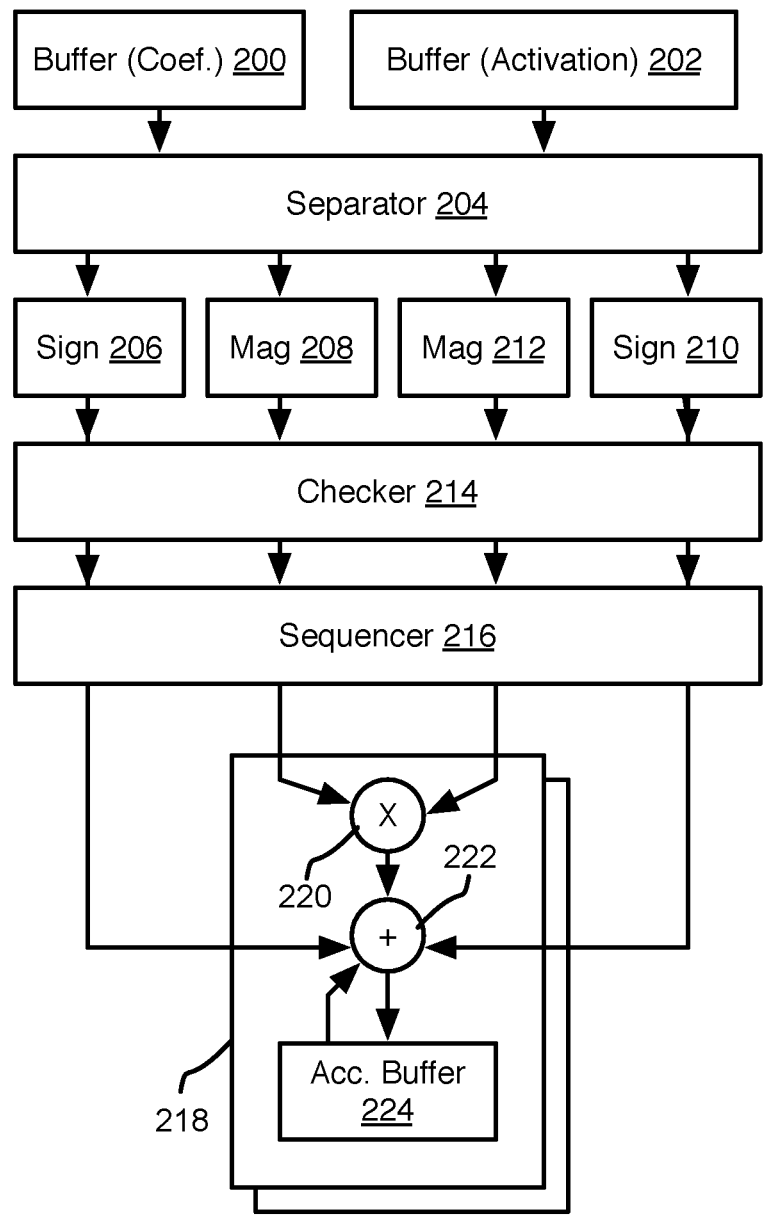
FIG. 2 is a schematic block diagram of a multiply/accumulate circuit in accordance with an embodiment of the present invention.

Referring to FIG. 2, a GPU 132 or other component of the computing device 100 may include the components shown in FIG. 2. As shown, buffers 200, 202 may store arguments that are to be the subject of a multiply/accumulate operation. For example, one buffer 200 may store a coefficient for implementing a graphics processing operation (e.g., a kernel), artificial intelligence operation (e.g., as part of a convolution neural network). The other buffer 202 may store values (often referred to as the "activation") to be multiplied by the coefficients. This is, of course, only an example, and any values may be loaded into the buffers 200, 202 and be the subject of a multiply/accumulate operation. The buffers 200, 202 may be defined as a portion of memory (RAM 114) or portion of a cache 134 or 136.

Each value retrieved from the buffers 200, 202 may be input to a separator 204. The separator 204 converts all values into unsigned values. For example, in some applications, values may be represented in the following format: [type][magnitude]. The [type] field indicates whether the bits in [magnitude] represent a signed or unsigned number, e.g. 0 indicating unsigned and 1 indicating signed. Where the [type] field indicates a signed value, the most significant bit (MSB) in the [magnitude] field will be 1 for negative numbers and 0 for positive numbers where 2's compliment representation is used.

The output of the separator 204 will be a sign 206 and a magnitude 208 for the value from the buffer 200 and a sign 210 and a magnitude 212 for the value from the buffer 202. The signs 206, 210 and magnitudes 208, 212 may then be input to a checker 214. The checker 214 evaluates the magnitudes 208, 212 to detect certain cases that require special processing. In particular, in order to limit the size of circuits performing the actual multiplication and addition of the multiply/accumulate operation, the number of bits used to represent the magnitudes 208, 212 may be limited to a number N of bits. For example, where values are defined as having the form [type][magnitude], the value of N may be the number of bits of values that are actually input to the multiplication circuit and may be less than the number of bits in the [magnitude] field. For example, where there are nine bits in the input values, there will be eight bits in the [magnitude] field. Accordingly, the number of bits N input to the multiplication circuit for each buffer 200, 202 may be N=seven in some embodiments.

However, for a signed value, seven bits will be insufficient to represent the magnitude of the largest negative number representable with eight signed bits, e.g., seven unsigned bits can only represent 0 to 127, whereas 8 signed bits may represent −128 to 127. The largest positive number that may be represented by the [magnitude] field of a signed value is referred to herein as MaxSign and may be defined as $2^N-1$, where the number of bits in the [magnitude field] is N+1.

Accordingly, the checker 214 may detect instances where a magnitude 208, 212 exceeds MaxSign and make adjustments in response. The manner in which this scenario is handled is described below with respect to FIG. 3.

For unsigned values, the maximum value represented with N+1 bits is $2^{(N+1)}-1$. Accordingly, values from $2^N$ to $2^{(N+1)}-1$ are not representable with N bits. The checker 214 may likewise discuss when a magnitude 208, 212 for an unsigned value exceeds MaxSign and make adjustments accordingly, as described below with respect to FIG. 3.

The output of the checker 214 are pairs of arguments, e.g. for a pair of values from the buffers 200, 202, the output of the checker 214 is one or more pairs of arguments to be input to a sequencer 216. The sequencer 216 submits the pairs of arguments to computation units 218. In particular, there may be multiple computation units, e.g. 8, 64, 1024, or any number of computation units. The sequencer 216 implements logic to submit arguments to a correct computation unit. In particular, the sequencer, 216 ensures that arguments for a pair of values from buffers 200, 202 are submitted to the computation unit 218 accumulating multiply/add results for that pair of values.

For example, in matrix multiplication, each value in the output matrix is a result of a dot product of a row of a first matrix with a column of a second matrix. Accordingly, in this example, the sequencer 216 submits arguments for pairs of input values from the buffers 200, 202 such that each computation unit 218 may accumulate a sum of the products of the elements of a particular row and the elements of a column corresponding to that row. Of course, this is only one example and the sequencer 216 can be programmed to accumulate products according to any desired function.

Each computation unit 218 may include an N-bit multiplier 220 that takes as inputs a pair of arguments from the sequencer 216 and an adder 222 that takes as inputs a product of the multiplier 220 and the contents of an accumulation buffer 224. The output of the adder 222 is written back to the accumulation buffer 224. The results of the accumulation buffer 224 may be read by a controller of a GPU 132, a CPU 102 according to control of an application, or according to any approach known in the art to retrieving and processing results of a multiply/accumulate operation. As shown in FIG. 2, the adder 222 may further take as inputs the signs of the input arguments as separated by the separator 204.

Figure 3:
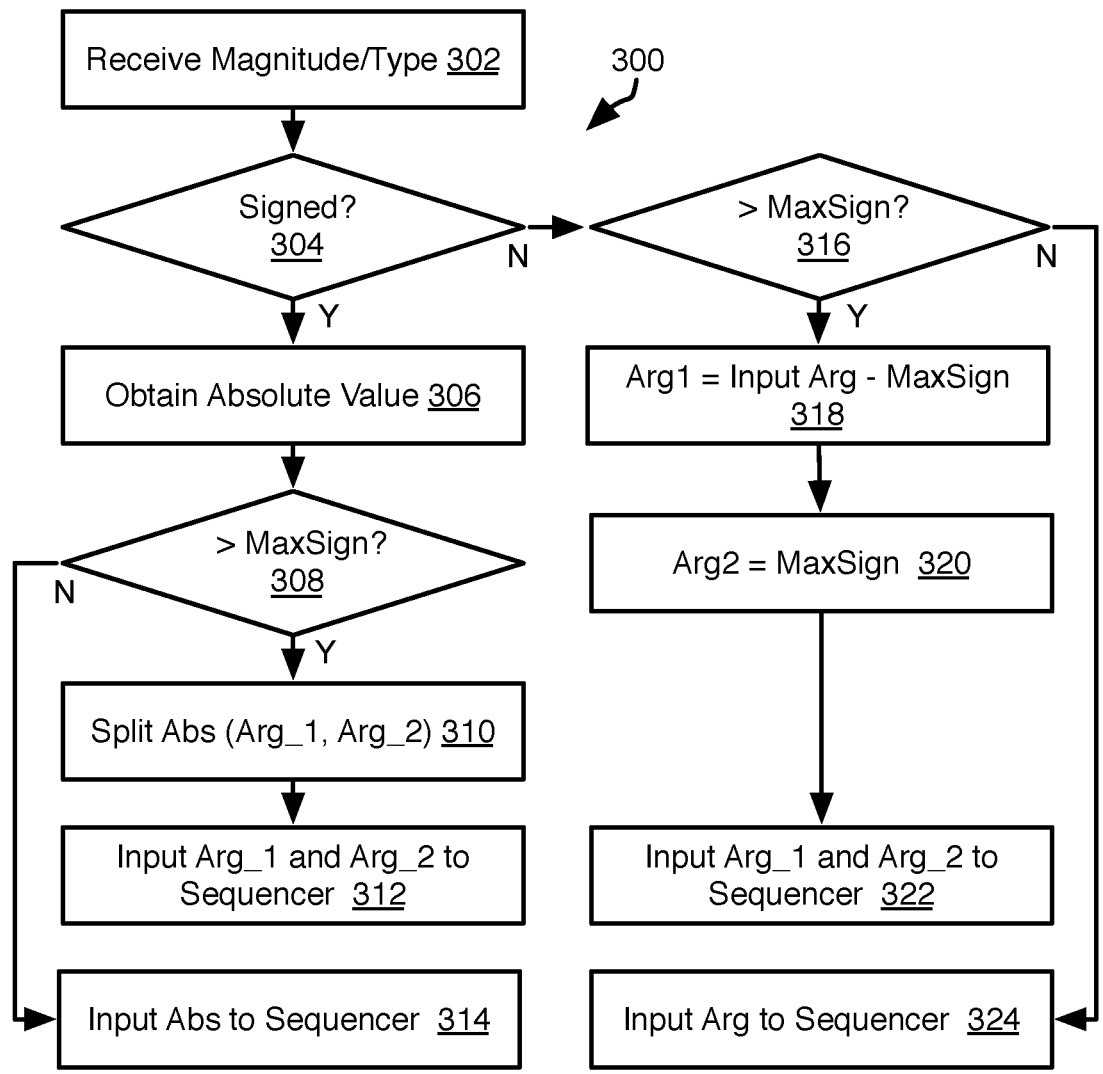
FIG. 3 is a process flow diagram of a method for processing input arguments in the multiply/accumulate circuit in accordance with an embodiment of the present invention.

Referring to FIG. 3, the illustrated method 300 may be executed by the checker 214 in order to determine whether to divide an input magnitude 208, 212 into two arguments or to output a single argument including the input magnitude 208, 212. The method 300 may be executed for each input magnitude 208, 212, referred to below as "the input magnitude."

The method 300 may include receiving 302 the magnitude and type of the input magnitude from the separator 204. If the type is found 304 to be signed, the method 300 may include obtaining 306 the absolute value of the input magnitude.

The method 300 may then include evaluating 308 whether the absolute value is greater than MaxSign. If not, then the absolute value may be input 314 to the sequencer 216 as an argument (Arg). If so, then the method 300 may include splitting 310 the absolute value into two arguments (Arg_1, Arg_2). In particular, for a signed value, the only value larger than MaxSign that is possible is MaxSign+1, accordingly, Arg_1 and Arg_2 may each be set equal to (MaxSign+1)/2. For example, for MaxSign=127, step 310 may include setting Arg_1=Arg_2=64.

The method 300 may then include inputting 312 Arg_1 and Arg_2 to the sequencer 216.

If the input magnitude is found 316 to not be from a signed number, the method 300 may include evaluating 318 whether the input magnitude is larger than MaxSign. If so, then two arguments are set according to steps 318 and 320: Arg_1 is set equal to the input argument less MaxSign and Arg_2 is set equal to MaxSign.

Arg_1 and Arg_2 are then input 322 to the sequencer. If the input magnitude is not found 316 to exceed MaxSign it is input as the argument (Arg) to the sequencer 216.

Inputting the arguments at steps 312, 314, 322, and 324 may be performed in a coordinated manner. Specifically, the argument or arguments as determined for the input magnitude for a value from buffer 200 may be input to the sequencer 216 in coordination with the argument or arguments as determined for the input magnitude for a corresponding value from the buffer 202.

As noted above, a first value and a second value to be multiplied together may be retrieved from the buffers 200, 202, respectively, and be processed by the separator 204 and checker 214. The pairs of arguments that will be input to the sequencer 216 for various outcomes of the method 300 for the first and second values are described in Table 1. In particular, for the first value, the possible outcomes of the method 300 are either a single output argument designated as Arg1 (step 312 or 324) or two output arguments designated here as Arg1_1 and Arg1_2 (step 312 or step 322). For the second value, the possible outcomes are designated as a single argument Arg2 (step 312 or 324) or two of output arguments Arg2_1 and Arg2_2 (step 312 or step 322). In the "Inputs to Sequencer column", each pair in parentheses indicates a pair of arguments input to the sequencer 216 that will be multiplied together and accumulated by a computation unit 218.

TABLE 1

Inputs to Sequencer for Outputs of Checker

| Argument(s) for First Value | Argument(s) for Second Value | Inputs to Sequencer |
|---|---|---|
| Arg1 | Arg2 | (Arg1, Arg2) |
| Arg1_1, Arg2_2 | Arg2 | (Arg1_1, Arg2), (Arg1_2, Arg2) |

TABLE 1-continued

Inputs to Sequencer for Outputs of Checker

| Argument(s) for First Value | Argument(s) for Second Value | Inputs to Sequencer |
|---|---|---|
| Arg1_1, Arg2_2 | Arg2_1, Arg2_2 | (Arg1_1, Arg2_1), (Arg1_2, Arg2_1) (Arg1_1, Arg2_2), (Arg1_2, Arg2_2) |
| Arg1 | Arg2_1, Arg2_2 | (Arg1, Arg2_1), (Arg1, Arg2_2) |

The sequencer 216 may be programmed to input the pairs of arguments to the same computation unit 218 that corresponds to the first and second values. The sequencer 216 may likewise associate the signs of each argument with it. In particular, where a signed value is split into two arguments Arg_1, Arg_2, the sign will be associated by the sequencer 216 with both of those arguments in all of the argument pairs including either of the two arguments Arg_1, Arg_2.

Figure 4:
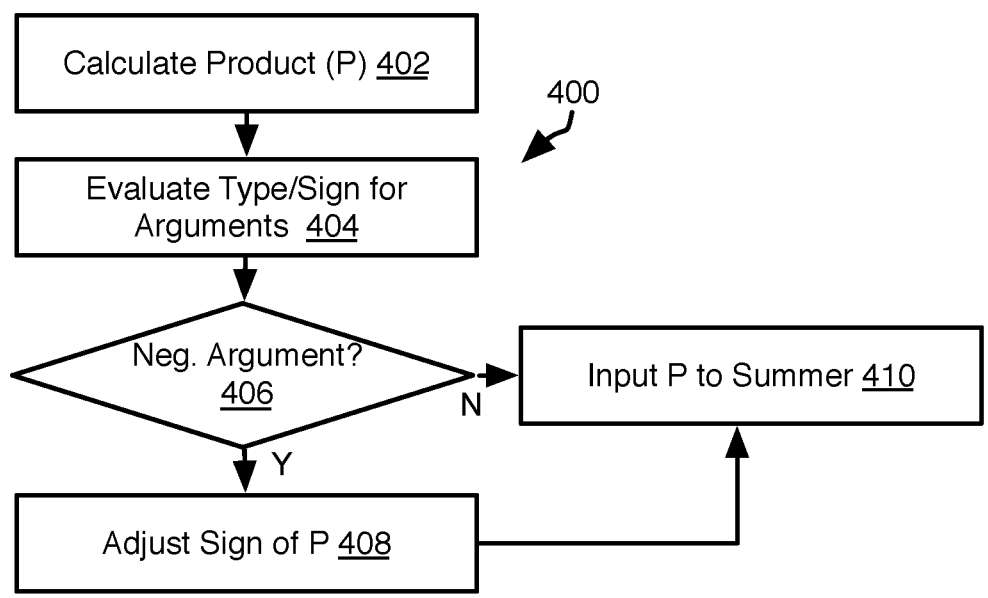
FIG. 4 is a process flow diagram of a method for post-processing products to be accumulated in the multiply/accumulate circuit in accordance with an embodiment of the present invention.

FIG. 4 illustrates a method 400 for performing the multiple/accumulate computation for a pair of arguments input to a computation unit 218 by the sequencer 216. Each pair of arguments input to the sequencer 216 will be input to the multiplier 220 of one of the computation units, which will then calculate 402 a product P. The method 400 may further include evaluating one or both of the type and sign of the arguments of the pair of arguments. For example, for arguments obtained from unsigned values, the sign at step 404 may be assumed to be positive in all cases. For signed values, the sign will be the sign 206, 210 as separated from the signed value by the separator 204.

If only one of the arguments is found 406 to have a negative sign, the method 400 may include adjusting 408 the product P. Where there is one negative argument, the sign of P is changed to negative, i.e. P is converted to a negative number, such as according to the 2's complement definition. The negative product P is then input 410 to the summer 222, which will then sum the negative product P with the current contents of the accumulation buffer 224 and write the result of the sum to the accumulation buffer 224.

If none of the arguments are found 406 to be negative, the product P is input 410 to the summer 222, which will then sum the product P with the current contents of the accumulation buffer 224 and write the result of the sum to the accumulation buffer 224.

As is apparent from the above description, multipliers 220 may be made much smaller while still providing the same level of precision using the approach described in FIGS. 2 through 4. In applications, such as a GPU, where there are many hundreds or thousands of computation units 218, this results in a large reduction in circuit area and power usage.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What are claimed are listed below:
1. A device comprising:
a splitter circuit configured to receive two input values and, for each input value of the two input values:

if the each input value has data type bit set to indicate a signed value, convert the each input value to a sign value and a magnitude value for the each input value; and if the each input value has the data type bit set to indicate an unsigned value set the magnitude value of the each input value to be the each input value;

a checker configured to convert the magnitude values of the two input values to one or more pairs of input arguments; and a computation unit configured to perform an operation on each pair of the one or more pairs of input arguments and any sign values of the two input values and produce an output according to the operation;

wherein input arguments of the one or more pairs of input arguments have N bits, N being a predefined integer; and wherein the checker is further configured to convert the magnitude values of the two input values into the one or more pairs of input arguments by:

(a) for a first magnitude (M1) of the magnitude values of the two input values:
if M1 corresponds to a first input value of the two input values that is signed and is larger than $2^{N-1}$, represent M1 with arguments $Arg1\_1=2^{(N-1)}$ and $Arg1\_2=2^{(N-1)}$; and (b) for a second magnitude (M2) of the magnitude values of the two input values:
if M2 corresponds to a second input value of the two input values that is signed and is larger than $2^{N-1}$, represent M2 with arguments $Arg2\_1=2^{(N-1)}$ and $Arg2\_2=2^{(N-1)}$; and wherein the computational unit includes one or more multiplier circuits having two N−1 bit multiplier inputs.

2. The device of claim 1, wherein the computation unit is programmed to perform a multiply/accumulate operation.

3. The device of claim 1, wherein the checker is configured to convert the magnitude values of the two input values into the one or more pairs of input arguments such that input arguments of the one or more pairs of input arguments have fewer bits than the magnitude values of the two input values.

4. The device of claim 3, wherein input arguments of the one or more pairs of input arguments have one bit less than the magnitude values of the two input values.

5. The device of claim 1, wherein the checker is configured to convert the magnitude values of the two input values into the one or more pairs of input arguments by:

(c) for the first magnitude:
if M1 corresponds to a first input value of the two input values that is unsigned and M1 is larger than $2^{N-1}$, divide M1 into arguments $Arg1\_1=M1-2^N+1$ and $Arg1\_2=2^N-1$; and (d) for the second magnitude:
if M2 corresponds to a second input value of the two input values that is unsigned and M2 is larger than $2^{N-1}$, divide M2 into arguments $Arg2\_1=M2-2^N+1$ and $Arg2\_2=2^N-1$.

6. The device of claim 5, wherein the checker is configured to convert the magnitude values of the two input values into the one or more pairs of input arguments by:

(e) if M1 is less than or equal to $2^{N-1}$, set an argument Arg1 of the one or more pairs of arguments to be M1; and (f) if M2 is less than or equal to $2^{N-1}$, set an argument Arg2 of the one or more pairs of arguments to be M2.

7. The device of claim 6, wherein the checker configured to convert the magnitude values of the two input values to the one or more pairs of input arguments by:
   if a result of (a) through (f) is Arg1 for M1 and Arg2 for M2 output one pair of input arguments that is (Arg1, Arg2);
   if a result of (a) through (f) is Arg1 for M1 and Arg2_1 and Arg2_2 for M2, output two pairs of input arguments: (Arg1, Arg2_1) and (Arg1, Arg2_2);
   if a result of (a) through (f) is Arg1_1 and Arg1_2 for M1 and Arg2_1 and Arg2_2 for M2, output four pairs of input arguments: (Arg1_1, Arg2_1), (Arg1_1, Arg2_2), (Arg1_2, Arg2_1), and (Arg1_2, Arg2_2); and
   if a result of (a) through (f) is Arg1_1 and Arg1_2 for M1 and Arg2 for M2, output two pairs of input arguments: (Arg1_1, Arg2) and (Arg1_2, Arg2).

8. The device of claim 7, further comprising a sequencer programmed to input the one or more pairs of input arguments to the computation unit, the computation unit being programmed to perform a multiply accumulate operation.

9. The device of claim 8, wherein the computation unit is programmed to, for each pair of input arguments of the one or more pairs of input arguments:
   calculate a product P of the each pair of input arguments;
   (g) if only one of the two input values from which the each pair of input arguments was derived according to (a) through (f) is a negative signed number, set P=−P; and
   after performing (g), add P to contents of an accumulation buffer to obtain a sum and writing the sum to the accumulation buffer.

10. The device of claim 1, wherein the splitter is configured to read the two input values from a coefficient buffer and an activation buffer.

11. A device programmed to:
   receive a first input value and a second input value;
   convert the first input value and the second input value into one or more pairs of input arguments, each argument of the one or more pairs of input arguments having fewer bits than the first input value and the second input value such that each argument of the one or more pairs of input arguments has no more bits than multiplier inputs of a multiplier in a computation unit, the multiplier inputs having fewer bits than the first input value and the second input value; and
   input the one or more pairs of input arguments into the computation unit;
   wherein input arguments of the one or more pairs of input arguments have N bits, N being a predefined integer; and
   wherein the device is further configured to convert the first input value and the second input value into the one or more pairs of input arguments by:
      (a) if the first input value is signed and a magnitude (M1) of the first input value is larger than $2^N-1$, divide M1 into arguments Arg1_1=$2^{(N-1)}$ and Arg1_2=$2^{(N-1)}$; and
      (b) if the second input value is signed and a magnitude (M2) of the second input value is larger than $2^N-1$, divide M2 into arguments Arg2_1=$2^{(N-1)}$ and Arg2_2=$2^{(N-1)}$.

12. The device of claim 11, wherein the computation unit performs a multiply accumulate operation.

13. The device of claim 11, wherein N is one bit less than a number of bits in the magnitude values M1 and M2.

14. The device of claim 11, wherein the device is further configured to convert the first input value and the second input value into the one or more pairs of input arguments by:
   (c) if the first input value is unsigned and M1 is larger than $2^N-1$, divide M1 into arguments Arg1_1=M1−$2^N$+1 and Arg1_2=$2^N-1$; and
   (d) if the second input value is unsigned and M2 is larger than $2^N-1$, divide M2 into arguments Arg2_1=M2−$2^N$+1 and Arg2_2=$2^N-1$.

15. The device of claim 14, wherein the device is further configured to convert the first input value and the second input value into the one or more pairs of input arguments by:
   (e) if M1 is less than or equal to $2^N-1$, set an argument Arg1 of the one or more pairs of arguments to be M1; and
   (f) if M2 is less than or equal to $2^N-1$, set an argument Arg2 of the one or more pairs of arguments to be M2.

16. The device of claim 15, wherein the device is further configured to convert the first input value and the second input value into the one or more pairs of input arguments by:
   if a result of (a) through (f) is Arg1 for M1 and Arg2 for M2 convert the first input value and the second input value into one pair of input arguments that is (Arg1, Arg2);
   if a result of (a) through (f) is Arg1 for M1 and Arg2_1 and Arg2_2 for M2, convert the first input value and the second input value into two pairs of input arguments: (Arg1, Arg2_1) and (Arg1, Arg2_2);
   if a result of (a) through (f) is Arg1_1 and Arg1_2 for M1 and Arg2_1 and Arg2_2 for M2, convert the first input value and the second input value into four pairs of input arguments: (Arg1_1, Arg2_1), (Arg1_1, Arg2_2), (Arg1_2, Arg2_1), and (Arg1_2, Arg2_2); and
   if a result of (a) through (f) is Arg1_1 and Arg1_2 for M1 and Arg2 for M2, convert the first input value and the second input value into two pairs of input arguments: (Arg1_1, Arg2) and (Arg1_2, Arg2).

17. The device of claim 16, wherein the device is further configured to, for each pair of input arguments of the one or more pairs of input arguments:
   calculate a product P of the each pair of input arguments;
   (g) if only one of the first and second input values is a negative signed number, set P=−P; and
   after performing (g), add P to contents of an accumulation buffer to obtain a sum and writing the sum to the accumulation buffer.

18. The device of claim 11, wherein the device is further configured to read the first input value from a coefficient buffer and to read the second input value from an activation buffer.

* * * * *